United States Patent [19]

Booth

[11] Patent Number: 5,026,135
[45] Date of Patent: Jun. 25, 1991

[54] MOISTURE SEALING OF OPTICAL WAVEGUIDE DEVICES WITH DOPED SILICON DIOXIDE

[75] Inventor: Bruce L. Booth, West Chester, Pa.

[73] Assignee: E. I. Du Pont de Nemours and Company, Wilmington, Del.

[21] Appl. No.: 513,321

[22] Filed: Apr. 20, 1990

[51] Int. Cl.⁵ .................................................. G02B 6/10
[52] U.S. Cl. ................................. 350/96.12; 350/96.34
[58] Field of Search ............... 350/96.11, 96.12, 96.15, 350/96.34; 204/192.15; 427/37

[56] References Cited

U.S. PATENT DOCUMENTS

| | | | |
|---|---|---|---|
| 4,518,219 | 5/1985 | Leonberger et al. | 350/96.18 X |
| 4,725,112 | 2/1988 | Bridges et al. | 350/96.12 |
| 4,737,015 | 4/1988 | Ishida et al. | 350/96.12 X |
| 4,929,302 | 5/1990 | Valette | 350/96.20 X |

Primary Examiner—William L. Sikes
Assistant Examiner—Phan T. Heartney
Attorney, Agent, or Firm—James H. Dautremont

[57] ABSTRACT

Optical waveguide devices have improved barrier properties after having been coated with silicon dioxide doped with certain metals.

28 Claims, 8 Drawing Sheets

MOISTURE SEALING OF OPTICAL WAVEGUIDE DEVICES WITH DOPED SILICON DIOXIDE

1. FIELD OF THE INVENTION

This invention relates to optical waveguide devices which have improved barrier properties after having been coated with silicon dioxide doped with certain metals.

2. BACKGROUND OF THE INVENTION

In optical communication systems, messages are transmitted typically through optical fibers by carrier waves of optical frequencies that are generated by sources such as lasers or light emitting diodes. There is much current interest in such optical communication systems because they offer several advantages over other communication systems, such as having a greatly increased number of channels of communication and the ability to use other materials besides expensive copper cables for transmitting messages.

As the development of optical circuits proceeded, it became necessary to have optical waveguide devices which could couple, divide, switch and modulate the optical waves from one optical fiber to another, or from one waveguide device to another. For example devices see U.S. Pat. Nos. 3,689,264, 4,609,252, 4,637,681, and 4,883,743, among others.

The preferred devices are made by photoforming the waveguides within photohardened polymeric structures, which however in harsh environments suffer from sensitivity to environmental gases, such as moisture in high humidity atmospheric conditions.

Thus, it is desirable to have a good barrier to oxygen or water vapor. However, the most common barrier materials, which are polymer based resins such as ethylene vinyl alcohol copolymer ("EVOH") or polyvinylidene chloride ("PVDC"), although exhibiting good barriers to oxygen or moisture, do so only under ideal conditions. Although EVOH can be an excellent oxygen barrier, it looses its barrier property at moderate to high relative humidity. Thus this material is not widely usable in applications involving high water vapor content.

Although PVDC exhibits good moisture and oxygen barrier properties, it is not suitable for many applications, and has an undesirable yellow color. Other proposed alternatives to provide oxygen and water vapor barriers include laminations of aluminum foil and aluminum metallized film. Although these exhibit good barrier properties, they are completely opaque, and in addition they cannot be readily used in environments involving microwaves, which may be desirable many times in applications involving both optical and electronic conditions.

U.S. Pat. No. 4,702,963 discloses packaging film in which an adhesion layer is first vacuum deposited on a flexible polymer substrate, followed by vacuum deposition of a barrier layer, to confer retortability to the packaging film. The adhesion layer can consist of Cr, which is preferred, co-deposited mixtures of Cr and SiO having at least 20% by weight Cr, among others. The barrier layer is preferably silicon monoxide or silicon dioxide. When silicon dioxide is used, it may be mixed with glass modifiers such as oxides of Mg, Ba, and Ca, or with fluoride of alkaline earth metals, e.g., $MgF_2$. The glass modifiers serve to alter the color appearance of the overall coating. For example, a chromium/SiO composite film is disclosed to produce a coating with a yellowish appearance, while a neutral gray appearance is disclosed to result from the mixture of $SiO_2$ with glass modifiers.

Japanese patent application 60-244540 discloses a laminate comprising the formation on the surface of a plastic film a transparent thin layer of one or more materials selected from metals, metal oxides, or glass by means of a dry plating method, providing a laminate with good barrier properties. Suitable metals include aluminum, silicon, iron, gold, silver, copper, chromium, nickel, tin, titanium, and magnesium. Suitable oxides may be the oxides of these metals (such as silicon oxide, which can be mixtures of silicon monoxide and silicon dioxide), and glass. A mixed evaporation or multilayer evaporation may be performed.

Japanese patent application 61-47244 discloses a laminate of a plastic film or sheet on the surface of which has been formed a transparent thin layer by dry plating one or more of the materials selected from metals, oxides of the metals, and glass. Suitable metals include aluminum, silicon, titanium, tin, iron, gold, silver, copper, chromium, nickel, magnesium, or the like. The oxides are those of these metals, or glass. These metals and metal oxides may be evaporated in a mixed state to form a layer or evaporated to form a multilayer. The laminate is said to have excellent gas-barrier performance.

U.S. Pat. No. 4,528,234 discloses a transparent laminate comprising a transparent plastic resin film substrate, a thin layer of at least one metal such as aluminum, tin, iron, zinc, or magnesium formed on the substrate by vacuum deposition, and a carboxyl group-containing polyolefin (e.g., ionomer) layer formed on the metal layer by lamination. Optionally an additional layer of silicon oxide or titanium oxide may be present. Oxygen and moisture impermeability are said to be improved.

U.S. Pat. No. 3,442,686 discloses a composite film structure suitable as a packaging film consisting of a flexible transparent organic base sheet, e.g., PET (polyethylene terephthalate) film, having a top coating of a polymer such as polyethylene and an intermediate, gas barrier, glassy coating of an inorganic material such as a silicon oxide. Other inorganic compositions which are useful include lead chloride, silver chloride, calcium silicate, and crushed "Alundum" ($Al_2O_3$ with $SiO_2$ binder).

Japanese patent application 62-158677 discloses a transparent laminate wrapping material where a thin single or mixed metal oxide layer is an intermediate layer in a laminate structure. The laminate is said to have excellent gaseous oxygen and water vapor barrier properties. Silicon oxide and aluminum oxide-silicon oxide mixtures are effective.

Japanese patent application 62-156943 discloses a vapor-deposited layer built-in type multilayered gas-barrier film or sheet having two or more vapor-deposited layers of metals or metal compounds formed at one or more laminate interfaces of a multilayered synthetic resin film or sheet, having good gas barrier characteristics. Suitable metals include aluminum, zinc, copper, platinum, indium, tin, gold, silver, and silicon. A suitable metal compound is silicon oxide.

Chahroudi, paper presented at annual technical meeting of Society of Vacuum Coaters discloses transparent barriers of silicon oxide. The $SiO_2$ can be alloyed with oxides of various metals to improve barrier properties.

Sakamaki, paper presented at "Barrier Pak '89" discloses barrier properties of film with a thin layer of ceramic such as SiO in particular silicon oxide.

U.S. Pat. No. 3,522,080 discloses a process for hardening the surface of a synthetic material such as a lacquer film, which includes vapor deposition of layers of silicon oxide (SiOx derived from $SiO_2$) onto the surface. The silicon oxide can contain 1.5 to 5 percent oxide of chromium, zinc, zirconium, or antimony.

U.K. patent application 2 197 881 discloses a heat resistant vessel made of a thermoplastic polyester resin by forming an inorganic coating layer comprising a silicon compound or a metal oxide-containing silicon compound on a surface of the polyester resin. The inorganic coating layer is obtainable from colloidal polysiloxane compounds. The coating material may further contain additives such as an inorganic filler of e.g., titanium oxide, zirconium silicate, nickel, copper oxide, manganese oxide, alumina, etc.

In certain of the above references, coatings of silicon monoxide (SiO), silicon dioxide ($SiO_2$), or combinations thereof with a variety of metal oxides have been disclosed. There has been lacking, however, teaching as to the type and quantity of metal or metal oxide required to provide coatings of $SiO_2$ with improved barrier properties. It has now been observed that combinations of $SiO_2$ with many metals or metal oxides in fact do not provide improved barrier performance or alternatively reduce the optical transparency of films coated therewith to an objectionable extent. Furthermore, much of the relevant art focuses on SiO as the primary barrier layer. The use of SiO is not practical for many packaging applications because it is quite expensive and exhibits an objectionable yellow color. The present invention, in contrast, overcomes these shortcomings by providing an inexpensive inorganic coating with good barrier performance and good light and microwave transparency, suitable as a barrier coating for optical waveguide devices.

3. SUMMARY OF THE INVENTION

The instant invention is directed to a structure having superior barrier properties, comprising an optical waveguide device polymeric substrate and a glassy coating of silicon dioxide doped with at least one metal selected from the group consisting of antimony, aluminum, chromium, cobalt, copper, indium, iron, lead, manganese, tin, titanium, tungsten, zinc, and zirconium, said coating and metal dopant contained therein being present in an amount which provides an oxygen transmission value through the coated film structure of at most about 5 mL/day-$m^2$-atm. Preferably the amount of metal dopant is sufficient to provide an oxygen permeation value for the glassy coating of at most about $3000 \times 10^{-6}$ mL-mm/day-$m^2$-atm.

The invention further provides a process for imparting barrier properties to a polymeric substrate, being part of an optical waveguide device comprising the steps of vacuum depositing onto the substrate a glassy coating prepared from silicon dioxide and at least one metal selected from the group consisting of antimony, aluminum, chromium, cobalt, copper, indium, iron, lead, manganese, tin, titanium, tungsten, zinc, and zirconium, wherein the amount of said glassy coating and the amount of metal contained therein is suitable to provide an oxygen transmission value through said film structure of at most about 5 mL/day-$m^2$-atm.

The present invention further provides a similar structure and process in which the dopant is lithium borate.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

Figure 1:
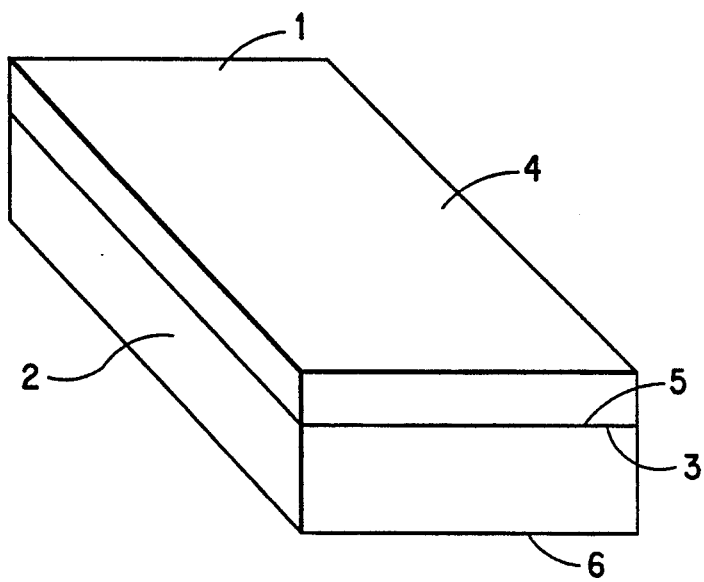
FIG. 1 is a perspective view of a photohardenable film removably adhered to a support.

This invention relates to optical waveguide devices which have improved barrier properties after having been coated with silicon dioxide doped with certain metals.

Although any type of optical waveguide devices having the waveguide embedded within their body may be used in accordance with this invention, the devices described in the detailed discussion of FIGS. 1-12 are preferable as being constructed of photohardenable materials and benefit significantly from the provisions of the instant invention.

It should be understood that although the Figures illustrate only elementary optical waveguide devices for simplicity purposes, the degree of complexity of the individual devices does not have adverse consequences with regard to the present invention.

Throughout the following detailed description, similar reference numerals refer to similar parts in all Figures of the drawing. In addition, the word "element" is used to denote a constituent of a final optical waveguide device.

Referring to FIG. 1, an element is illustrated comprising a substantially dry photohardenable film 1 removably adhered to a support 2. The film 1 has a first surface 3 and a second surface 4. The support similarly has a first surface 5 and a second surface 6. The first surface 5 of the support 2 is removably adhered to the first surface 3 of the film 1. The surfaces 3, 4, 5 and 6 of the film 1 and the support 2 are preferably substantially flat. The photohardenable film 1 may also be referred to in this discussion as a base layer or as a waveguide layer.

The film 1 may have a thickness in the range of 2 micrometers through 15 micrometers or above, preferably in the range of 4.5 micrometers through 8.0 micrometers, and more preferably about 5.3 micrometers.

Figure 2A:
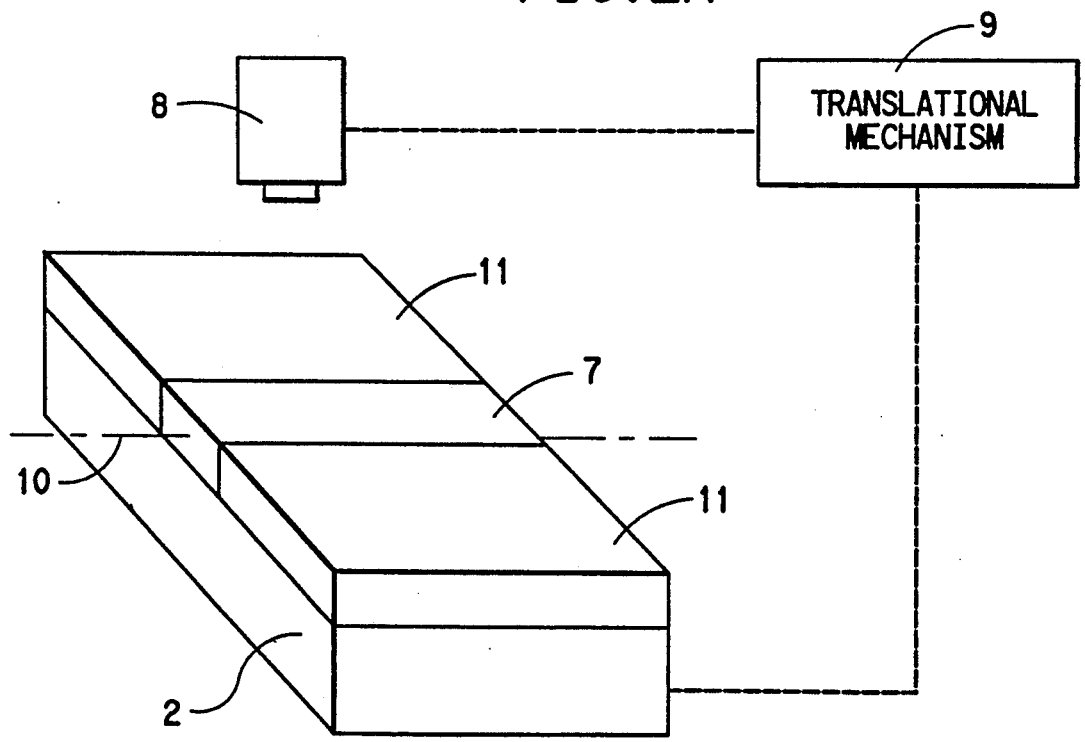
FIG. 2a is a schematic representation of a preferred way for forming an optical waveguide in a film on a support.
Figure 2B:
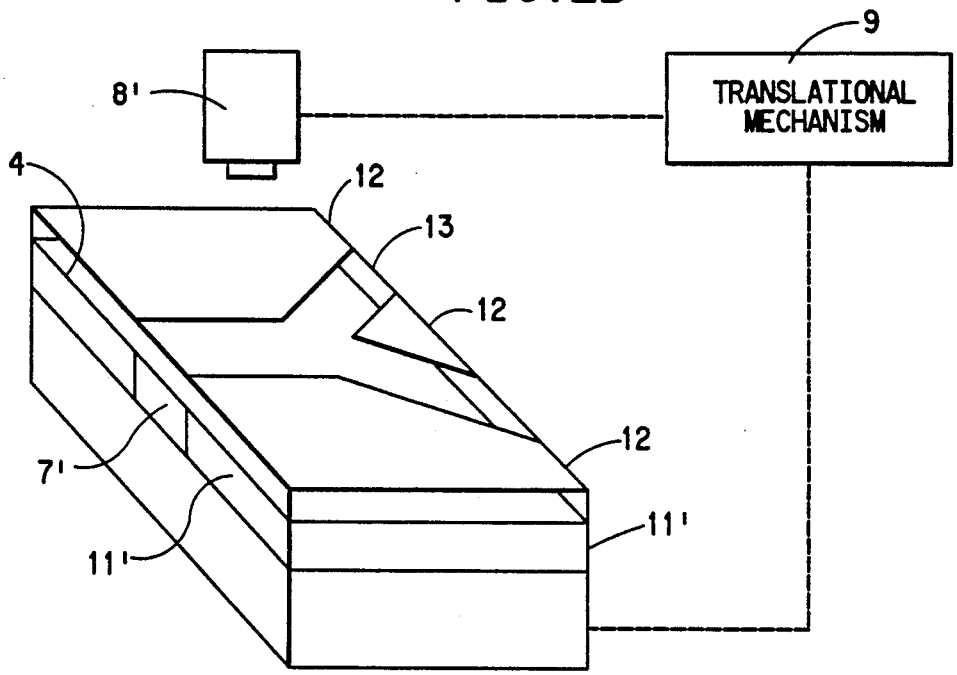
FIG. 2b is a schematic representation of a second preferred way for forming an optical waveguide having a Y configuration in a film on a support.
Figure 2C:
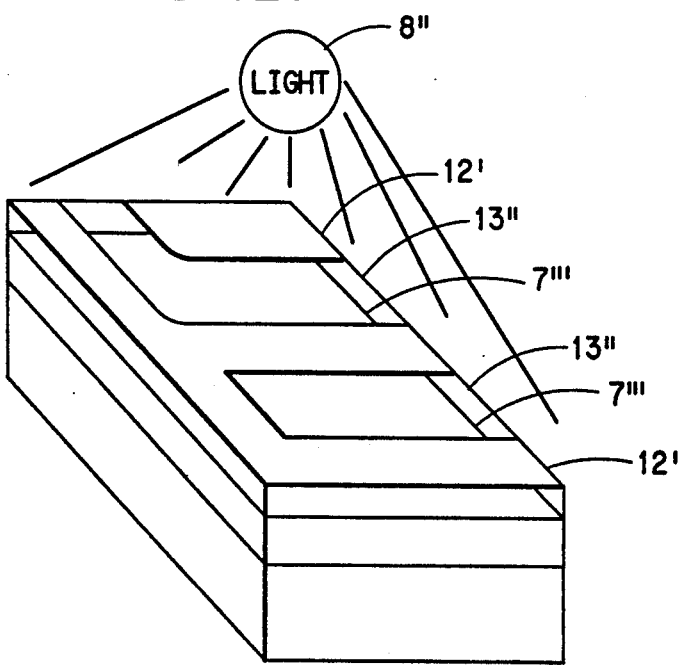
FIG. 2c is a schematic representation of a third preferred way for forming an optical waveguide having a different configuration in a film on a support.

Referring to FIGS. 2a, 2b, and 2c, the first step of the method of making the preferred devices according to the present invention comprises exposing to light at least a first region 7 of the film 1 polymerizing at least one monomer in the film 1 and changing the refractive index of the region 7 to form at least a first optical waveguide. The term waveguide is defined by those skilled in this art to include the entire area that transmits radiant energy. This technically includes some area just around the exposed region can by considered to substantially be the waveguide. In theory, the waveguide formation is believed to be due to a self-focusing property of the film material. Upon exposure to light, a polymerization reaction is induced in the exposed region. It is believed that there is interdiffusion between the exposed and unexposed regions, at least near the interface of these regions. This interdiffusion changes and typically increases the density of the exposed region raising its refractive index creating a lens-like exposed region directing the light in a self focused fashion to create a narrow smooth walled waveguide of approximately the same dimension as a mask area or light beam width. Three ways for performing this first step are illustrated in FIGS. 2a, 2b and 2c.

In FIG. 2a, a focused laser light source 8 exposes the region 7 to form the waveguide. A translational mechanism 9 is connected to the laser light source 8 and/or the support 2 for moving the laser light source 8, the support 2 or both, to create the waveguide having a desired and/or predetermined pattern. Here, the exposed region 7 has a substantially elongated box configuration having an optical axis 10 through the longitudinal center of the region 7. A physical cross section of the exposed region 7 perpendicular to the optical or center axis 10 is substantially rectangular. On both sides of the region 7 are remaining unexposed regions 11 of the film 1.

FIG. 2b shows an alternate way for exposing a region 7'. Here, a non-focused laser light source 8' is generally directing actinic radiation toward the element of FIG. 1. An opaque mask 12 is positioned between the laser light source 8 and the film 1, typically contacting and covering the second film surface 4. The mask 12 has at least a patterned area 13 therein through which actinic radiation from the light source 8' exposes region 7'. The patterned area can have any desired configuration, including the substantially Y configuration shown in FIG. 2b.

Exposing the region 7' through this area 13, results in the creation of a waveguide having a substantially Y configuration. Described more generically, the region can have one end adapted to inlet or outlet light connected to a plurality of ends (e.g., 2, 3, 4 . . . ) adapted to inlet or outlet light. As in the FIG. 2a case, there are remaining unexposed regions 11' in the film 1.

A third way for performing the exposing step of the present method is illustrated in FIG. 2c. Here, actinic radiation from a light source 8" exposes a first region 7" and a second region 7'" of the film 1 through an opaque mask 12'. This mask 12' has first and second areas 13' and 13" for the light to pass through exposing regions 7" and 7'", respectively. The second area 13" approaches and is in part parallel to the first area 13'. Thus, after exposure, the exposed second region 7'" and the corresponding waveguide. As a result, the waveguides can be positioned to exhibit evanescent coupling of light injected into one of the waveguides by gradually leaking or coupling the injected light into the other waveguide.

In each of these preferred ways, after exposure, the first and second surfaces 3 and 4 of the film 1 remain substantially flat. This facilitates subsequent laminating of layers on the film surfaces. As such, FIGS. 2a, 2b and 2c illustrate the making of optical waveguide elements, useful in making optical waveguide devices, which in turn are useful in integrated optical systems.

Figure 3:
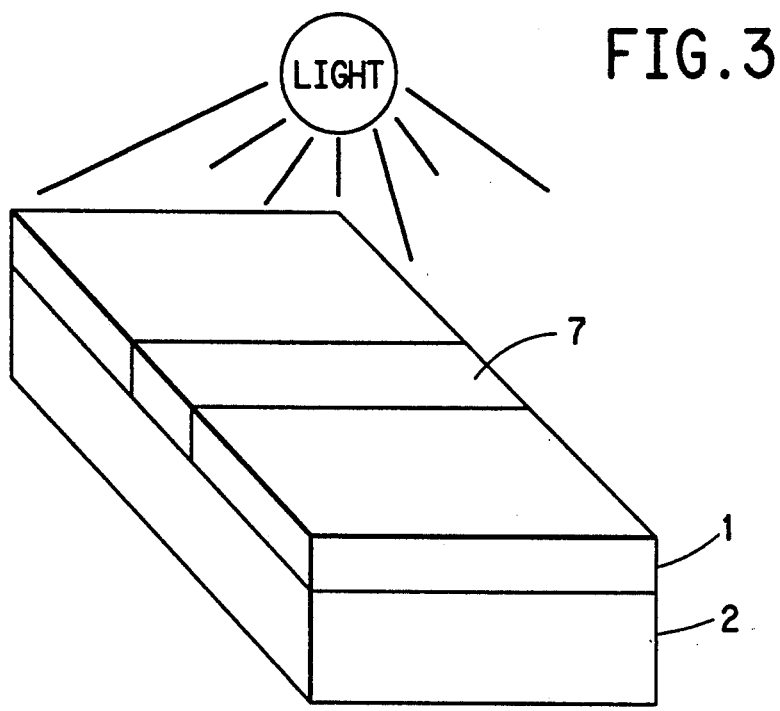
FIG. 3 depicts an optional step of flooding the film having a waveguide on a support with light.

FIG. 3 illustrates an optional step which follows the exposing step. The element resulting from the exposure step can be flooded with light, such as broadband ultraviolet light. This polymerizes some of at least one monomer in the film and typically most or all of one or all of the monomers in the film. This may allow for easy removal or attachment of the support 2. This resulting optical waveguide element can similarly be used in making optical waveguide devices, which devices are preferably used in the present invention.

Figure 4:
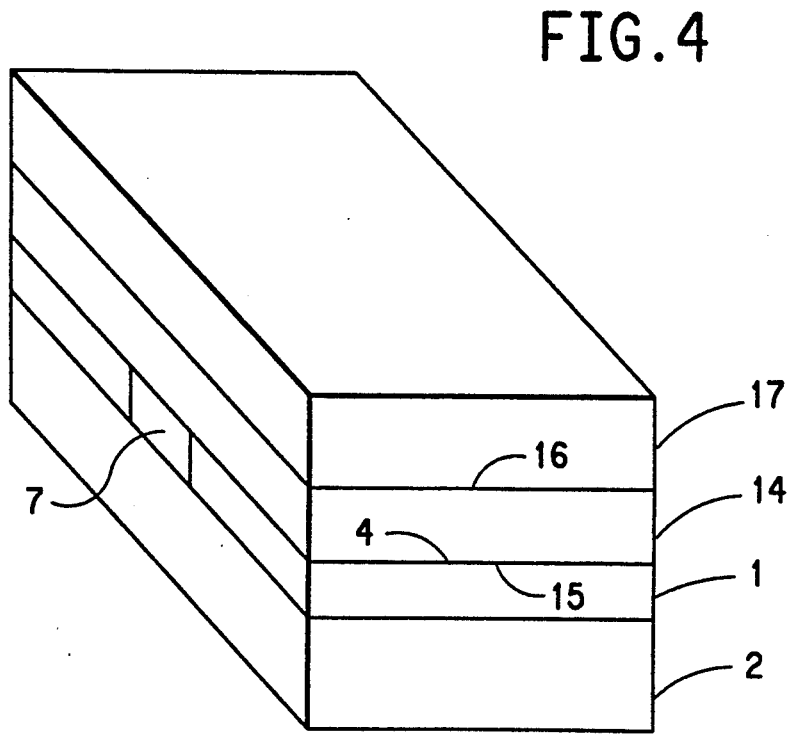
FIG. 4 shows a laminated structure comprising from top to bottom a support, a photohardenable layer, a film having a waveguide, and another support.

Next, referring to FIG. 4, a first substantially dry photohardenable layer 14 is laminated to the second film surface 4. The first layer 14 has first and second surfaces 15 and 16, respectively. The first layer 14 first surface 15 is laminated to the second film surface 4 by placing them in intimate contact and controllably applying pressure with rollers to remove air between the film 1 and layer 14. The first layer 14 is tacky. If the optional flooding step illustrated in FIG. 3 is not performed, then the film 1 is also tacky. Thus, the film 1 and first layer 14 easily adhere to one another. A support 17 is removably adhered to the second surface 16 of the first layer 14. FIG. 4 illustrates another optical waveguide element useful in making optical waveguide devices, which devices are preferably used in the present invention.

Figure 5:
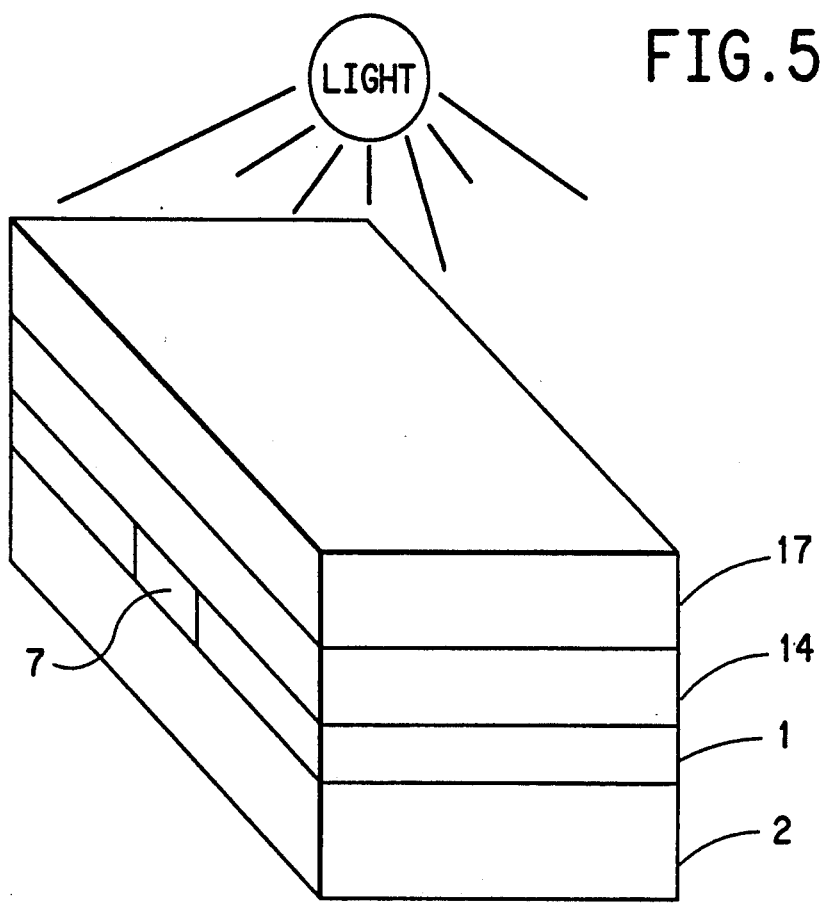
FIG. 5 illustrates an optional step of flooding the structure of FIG. 4 with light.

FIG. 5 shows an optional flooding step similar to that illustrated in FIG. 3, except the element being flooded is modified as described in relation to FIG. 4. The element resulting from the first lamination step can be flooded with light, such as broadband ultraviolet light. This polymerizes some of at least one monomer (and typically most or all of one or all of the monomers) in the first layer 14 and further polymerizes some of the at least one monomer in the film 1 (if not already polymerized by a previous flooding step). Extensive crosslinking or polymerization occurs between the monomer(s) of the layer 14 adjacent to the monomer(s) of the film 1 forming a diffuse boundary line or region. The resulting optical waveguide element is also useful in making an optical waveguide device in accordance with this invention.

Figure 6:
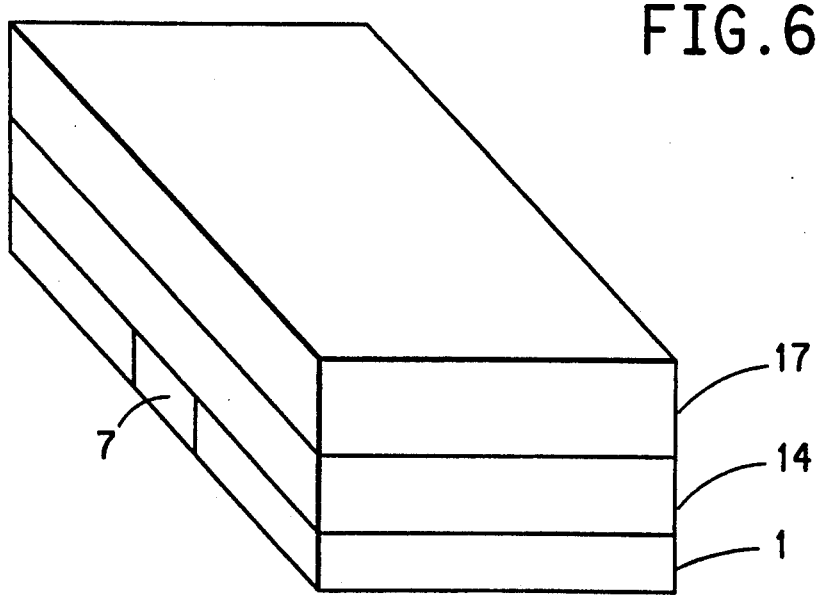
FIG. 6 is the structure of FIG. 4 or 5 with one of the supports removed.

FIG. 6 shows the element after the next step of removing the support 2 from the film 1 first surface 3.

Figure 7:
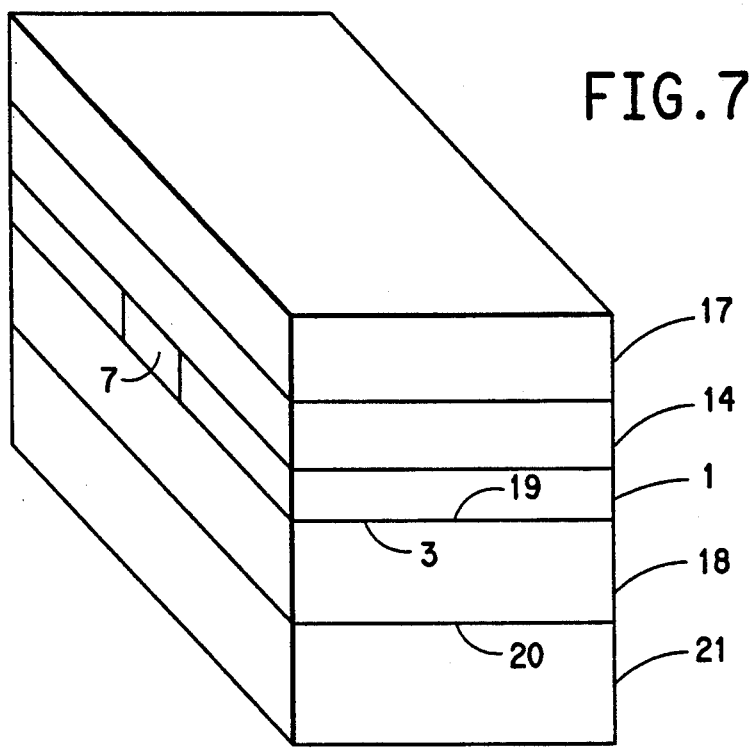
FIG. 7 is a perspective view of an optical waveguide device comprising from top to bottom a support, a photohardenable or photohardened layer, a film having a waveguide, a photohardenable layer, and a support.

Then, referring to FIG. 7, a second substantially dry photohardenable layer 18 is laminated to the film 1 first surface 3. The second layer 18 has first and second surfaces 19 and 20, respectively. The second layer 18 first surface 19 is laminated to the film first surface 3 by placing it in intimate contact and controllably applying pressure with rollers removing air between the film 1 and second layer 8. The second layer surfaces 19 and 20 are tacky and, thus, easily adhere to the film 1. A support 21 is removably adhered to the second layer second surface 20. Films 14 and 18 may also be referred to as inner buffer layers, since they surround the waveguide and they are in contact with the base or waveguide layer. If more buffer layers are built, mainly to strengthen the structure, outside the inner buffer layers, they are referred to as outer buffer layers.

Figure 8:
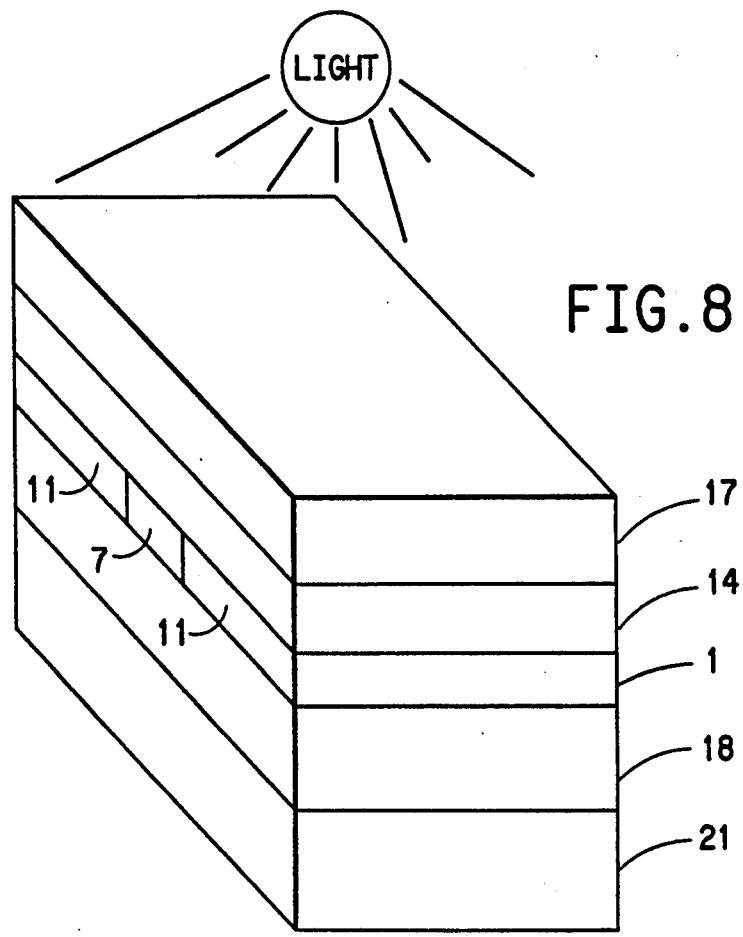
FIG. 8 shows the step of hardening the device of FIG. 7 by flooding it with light.

FIG. 8 illustrates a step of hardening the structure depicted in FIG. 7 by flooding it with light, such as broadband ultraviolet light. Throughout this application, the term "broadband ultraviolet light" means light in the spectral region of about 350 through 400 nanometers. This step occurs for minutes, preferably 5, but can last longer. If this is the first flooding step, then this is the first polymerization of at least one monomer (and typically most or all of one or all monomers) in the remaining regions 11 in the film 1 and the first and second layers 14 and 18, respectively. It further polymerizes the at least one monomer in the region 7 of the film 1. If this is not the first flooding step, it polymerizes at least one monomer in the second layer and continues polymerizing the at least one monomer in the rest of the element. Some crosslinking or polymerization occurs between the previously polymerized film 1 and the monomer(s) in the second layer 18 forming a boundary line or region that is more evident than if the film 1 had not previously been flooded with light. Further, if this is not the first flooding step, for instance if buffer layer 14 was previously hardened by flooding it with light as illustrated in FIG. 5, then it would be preferred to harden the film 1 and the buffer layer 18 of the element illustrated in FIG. 8 by flooding light first through support 21, layer 18, film 1, layer 14, and then support 17. In other words, the structure should be flooded such that light passes through unhardened layers or films before previously hardened ones.

Furthermore, any one or all of the buffer layers and the film with a waveguide formed therein can be hardened by flooding them with light before the layers or film are laminated to the other parts. A device results having at least one buried channel waveguide in a laminated and photohardened matrix useful in integrated optical systems.

Figure 9:
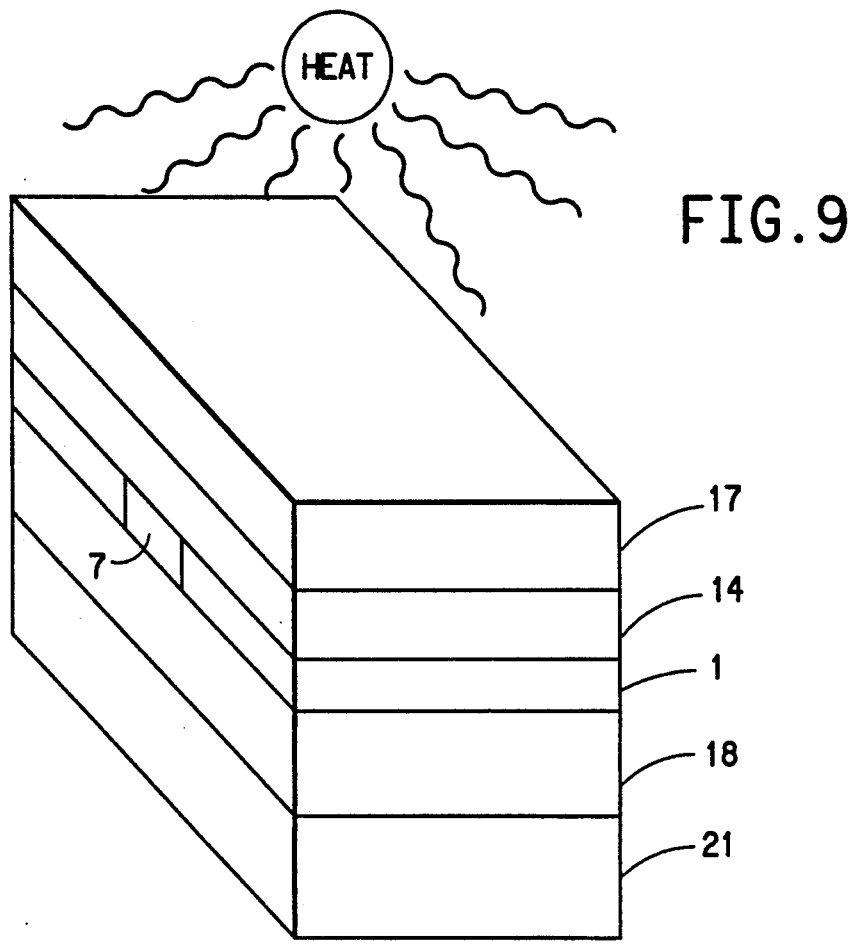
FIG. 9 shows the step of hardening the element of FIG. 7 or the device of FIG. 8 by heating it.

FIG. 9 illustrates another possible step of hardening the structure depicted in FIG. 7 by heating it. Actually, the layers and film can be heated before, in combination with, after, or in lieu of the light flooding step to harden of further harden the device. This heating step occurs at a temperature in the range of about 50° C. through 200° C. and preferably in the range of about 100° C. through 150° C. for a duration of minutes, preferably 5.

Photohardenable compositions are typically less sensitive to temperatures up to 100° C. than above 100° C. However, hardening may be initiated as low as 50° C. if held at the temperature for a sufficient period of time. As the temperature is increased beyond 100° C., thermally initiated hardening increases significantly.

After the hardening step, a maximum refractive index increase in the localized waveguide region as measured by an ASUJENA Interphako microscope occurs in the film in the range of 0.001 through 0.40 measured at 546 nanometers wavelength. The localized refractive index increase, n, may be derived by conventional shearing interference microscopy techniques and is calculated assuming a uniform index shift through the film such that n is effectively an average using the following equations:

$$f\lambda = \Delta n d$$

$$f = \frac{a}{b}$$

$$\frac{a\lambda}{b} = \Delta n d$$

where
 d = assumed waveguide thickness, typically the film thickness
 a = waveguide fringe shift
 b = fringe spacing
 $\lambda = 0.546\ \mu$, wavelength of light in the microscope This localized refractive index increase is contrasted and is not to be confused with a refractive index modulation measured from gratings prepared holographically.

After the hardening step, the waveguide is transparent in the range of 0.6 through 1.6 micrometers wavelength. It is effectively transparent at 1.3 micrometers for single mode operation. Also after the hardening step, the maximum refractive index of the matrix except in and near the waveguide is in the range of 1.45 through 1.60 measured at 632 nanometers depending on formulation and/or extent of interlayer diffusion from adjoining layers or film of different indexes. The refractive index is determined by using an ABBE refractometer manufactured by Karl Zeiss.

Figure 10:
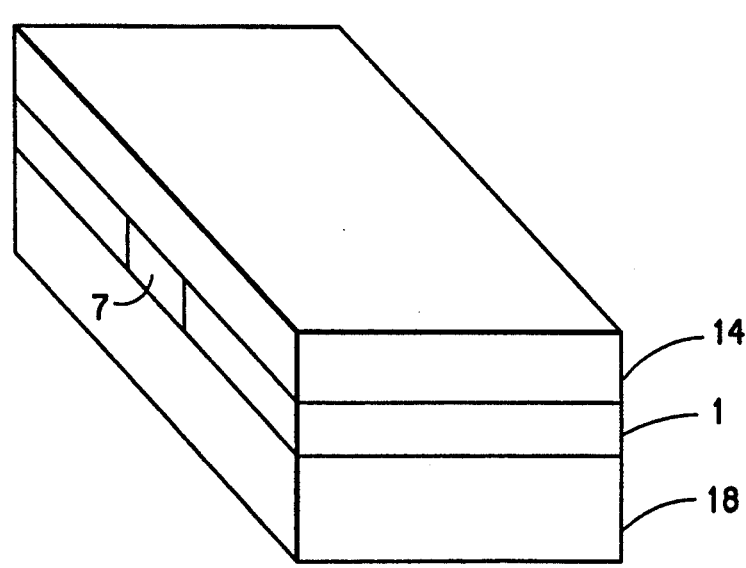
FIG. 10 is a perspective view of an optical waveguide device for use in integrated optical systems, the device comprising from top to bottom a first hardened layer, a hardened film having a waveguide, and a second hardened layer.

The supports 17 and 21 can be removed from the device resulting from the hardening step as shown in FIG. 10.

It has been found that a time delay of 5 to 120 minutes, preferably 20 to 30 minutes, after each flooding step and before removal of support sheets facilitate interlayer diffusion and polymerization.

Figure 11:
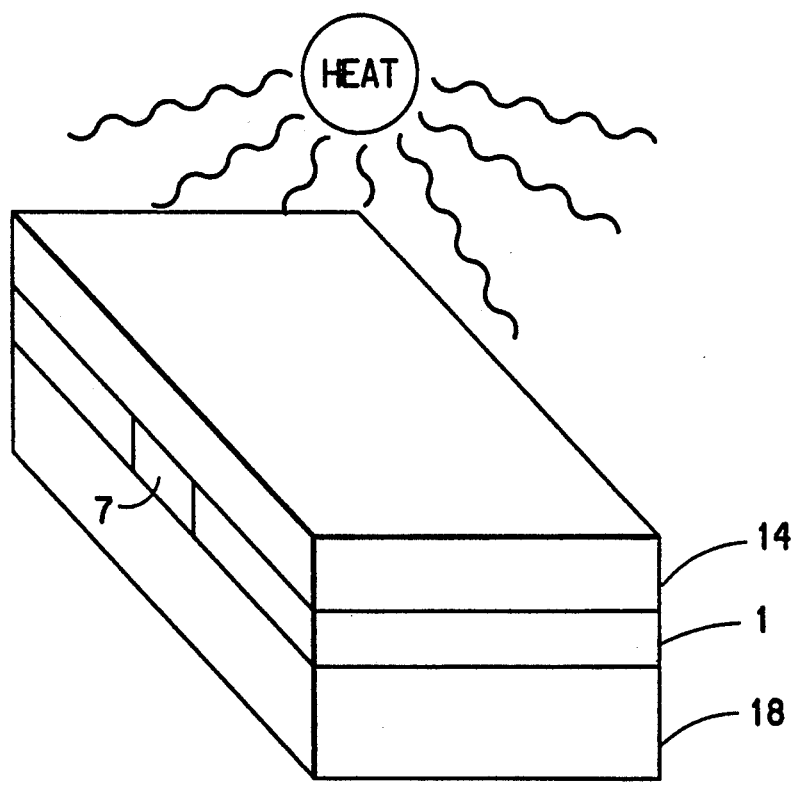
FIG. 11 shows the step of stabilizing the device of FIG. 10 by heating it.

FIG. 11 shows an optional, but preferred, step of stabilizing the device shown in FIG. 10 by heating it, typically after the hardening step. This heating step similarly occurs at a temperature in the range of about 50° C. thorough 200° C. and preferably in the range of about 100° C. through 150° C. However, this stabilizing step occurs longer than the hardening step. Preferably the stabilizing step occurs in the range of about 20 minutes through 2 hours and more preferably for about an hour. This heating makes the device more environmentally stable ensuring water and other elements in the environment will not interfere with proper operation of the device. Further, this heating provides thermal stabilization of optical and mechanical properties allowing operation of the resulting device over a wide range of temperatures without modification of the device properties.

All layers can be made out of the same material as the film 1. Then the hardened device matrix is substantially homogeneous in composition and refractive index except in and near the waveguide. Preferably, however, after the hardening step, the waveguide has a refractive index about 0.005 and 0.060 greater than the hardened film and about 0.001 to 0.025 greater than the hardened layers. Of course, regardless of whether different materials are used for different layers and the film, the composition and refractive index in each exposed region is substantially homogeneous in composition and refractive index.

Figure 12:
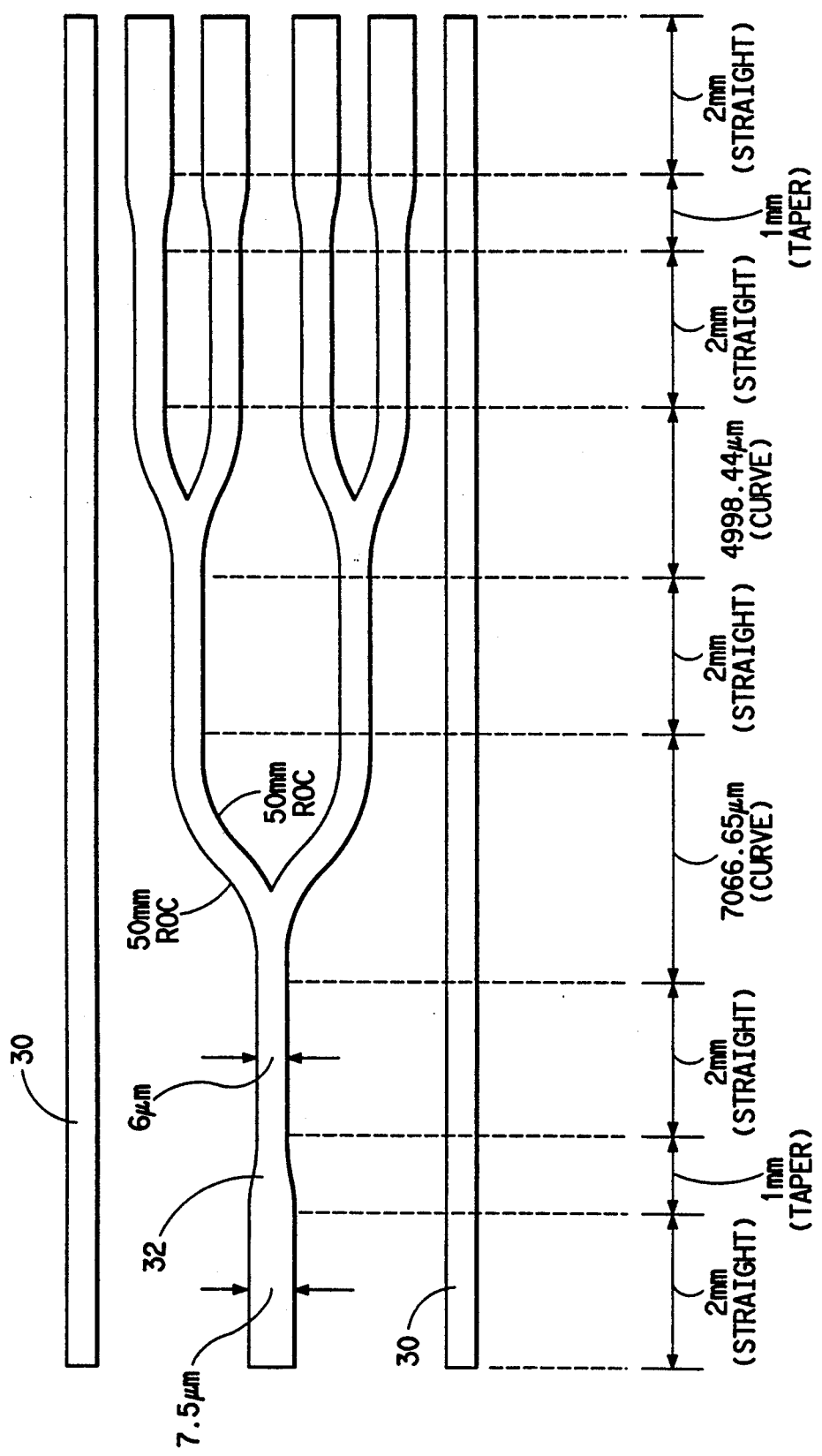
FIG. 12 shows a test pattern comprising two straight waveguides, and one $1 \times 4$ splitter.

FIG. 12 shows a test pattern, which has been used for evaluation purposes. It comprises two straight waveguides 30, and one 1×4 splitter 32. The dimensions and the radius of curvature (ROC) are shown in FIG. 12. The pattern may be used in a photomask to produce the respective waveguides on the base or waveguide layer by exposure through the photomask. Evidently, the areas represented by 30 and 32 are transparent in the photomask, the rest of the area being opaque.

The photohardenable base and buffer layers used herein are thermoplastic compositions which upon exposure to actinic radiation from crosslinks or polymers of high molecular weight to change the refractive index and rheological character of the composition(s). Preferred photohardenable materials are photopolymerizable compositions, such as disclosed in U.S. Pat. No. 3,658,526 (Haugh) and more preferred materials are described copending application Ser. Nos. 07/144,355, 07/144,281 and 07/144,840, all filed Jan. 15, 1988 and all assigned to E. I. du Pont de Nemours and Company, Incorporated. In these materials, free radical addition polymerization and crosslinking of a compound containing one or more ethylenically unsaturated groups, usually in a terminal position, hardens and insolubilizes the composition. The sensitivity of the photopolymerizable composition is enhanced by the photoinitiating system which may contain a component which sensitizes the composition to predetermined radiation sources, e.g., visible light. Conventionally a binder is the most significant component of a substantially dry photopolymerizable base or layer in terms of what physical properties the base or layer will have while being used in the invention. The binder serves as a containing medium for the monomer and photoinitiator prior to exposure, provides the base line refractive index, and after exposure contributes to the physical and refractive index characteristics needed for the base layer of buffer layer. Cohesion, adhesion, flexibility, diffusibility, tensile strength, in addition to index of refraction are some of the many properties which determine if the binder is suitable for use in the base layer or the buffer layer.

Dry base or layer photohardenable elements contemplate to be equivalent are photodimerizable or photocrosslinkable compositions such as disclosed in U.S. Pat. No. 3,526,504 (Celeste) or those compositions in which hardening is achieved by a mechanism other than the free radical initiated type identified above.

While the photopolymerizable base or layer is a solid sheet of uniform thickness it is composed of three major components, a solid solvent soluble preformed polymeric material, at least one liquid ethylenically unsaturated monomer capable of addition polymerization to produce a polymeric material with a refractive index substantially different from that of the preformed polymeric material, or binder, and a photoinitiator system activatable by actinic radiation. Although the base or layer is a solid composition, components interdiffuse before, during and after imaging exposure until they are fixed or destroyed by a final uniform treatment usually by a further uniform exposure to actinic radiation. Interdiffusion may be further promoted by incorporation into the composition of an otherwise inactive plasticizer.

In addition to the liquid monomer, the composition may contain solid monomer components capable of interdiffusing in the solid composition and reacting with the liquid monomer to form a copolymer with a refractive index shifted from that of the binder.

In the preferred compositions for use as the base layer or buffer layers in this invention, the preformed polymeric material and the liquid monomer are selected so that either the preformed polymeric material or the monomer contains one or more moieties taken from the group consisting essentially of substituted or unsubstituted phenyl, phenoxy, naphthyl, naphthyloxy, heteroaromatic groups containing one to three aromatic rings, chlorine, and bromine and wherein the remaining component is substantially free of the specified moieties. In the instance when the monomer contains these moieties, the photopolymerizable system hereinafter is identified as a "Monomer Oriented System" and when the polymeric material contains these moieties, the photopolymerizable system hereinafter is identified as a "Binder Oriented System."

The stable, solid, photopolymerizable compositions preferred for this invention will be more fully described by reference to the "Monomer Oriented System" and "Binder Oriented System." The Monomer Oriented System is preferred for the base layer.

The monomer of the Monomer Oriented System is a liquid, ethylenically unsaturated compound capable of addition polymerization and having a boiling point above 100° C. The monomer contains either a phenyl, phenoxy, naphthyl, naphthoxy, heteroaromatic group containing one to three aromatic rings, chlorine or bromine. The monomer contains at least one such moiety and may contain two or more of the same or different moieties of the group, provided the monomer remains liquid. Contemplated as equivalent to the groups are substituted groups where the substitution may be lower alkyl, alkoxy, hydroxy, carboxy, carbonyl, amino, amido, imido or combinations thereof provided the monomer remains liquid and diffusible in the photopolymerizable layer.

Preferred liquid monomers for use in the Monomer Oriented System of this invention are 2-phenoxyethyl acrylate, 2-phenoxyethyl methacrylate, phenol ethoxylate acrylate, 1-(p-chlorophenoxy) ethyl, p-chlorophenyl acrylate, phenyl acrylate, 1-phenylethyl acrylate, di(2-acryloxyethyl) ether of bisphenol-A, and 2-(2-naphthyloxy) ethyl acrylate.

While monomers useful in this invention are liquids, they may be used in admixture with a second solid monomer of the same type, e.g., N-vinyl-carbazole, ethylenically unsaturated carbazole monomers such as disclosed in *Journal of Polymer Science: Polymer Chemistry Edition*, Vol. 18, pp. 9–18 (1979) by H. Kamagawa et al., 2-naphthyl acrylate, pentachlorophenyl acrylate, 2,4,6-tribromophenyl acrylate, and bisphenol-A diacrylate, 2-(2-naphthyloxy) ethyl acrylate, and N-phenyl maleimide.

The solvent soluble polymeric material or binder of the Monomer Oriented System is substantially free of phenyl, phenoxy, naphthyl, naphthyloxy, heteroaromatic group containing one to three aromatic rings, chlorine and bromine.

Preferred binders for use in the Monomer Oriented system of this invention are cellulose acetate butyrate polymers; acrylic polymers and inter polymers including polymethyl methacrylate, methyl methacrylate/methacrylic acid and methylmethacrylate/acrylate acid copolymers, terpolymers of methylmethacrylate/C$_2$-C$_4$ alkyl acrylate or methacrylate/acrylic or methacrylic acid; polyvinylacetate; polyvinyl acetal, polyvinyl butyral, polyvinyl ormal; and as well as mixtures thereof.

The monomer of the Binder Oriented System is a liquid ethylenically unsaturated compound capable of addition polymerization and having a boiling point above 100° C. The monomer is substantially free of moieties taken from the group consisting essentially of phenyl, phenoxy, naphthyl, naphthyloxy, heteroaromatic group containing one to three aromatic rings chlorine and bromine.

Preferred liquid monomers for use in Binder Oriented Systems of this invention include decanediol diacrylate, iso-bornyl acrylate, triethylene glycol diacrylate, diethyleneglycol diacrylate, triethylene glycol dimethacrylate, ethoxyethoxyethyl acrylate, triacrylate ester of ethoxylated trimethylolpropane, and 1-vinyl-2-pyrrolidinone.

While monomers used in Binder Oriented Systems are liquids, they may be used in admixture with a second solid monomer of the same type, e.g., N-vinylcaprolactam.

The solvent soluble polymeric material or binder of the Binder Oriented system contains in its polymeric structure moieties taken from the group consisting essentially of phenyl, phenoxy, naphthyl naphthyloxy or heteroaromatic group containing one to three aromatic rings as well as chloro or bromo atoms. Contemplated as equivalent to the groups are substituted groups where the substitution may be lower alkyl, alkoxy, hydroxy, carboxy, carbonyl, amido, imido or combinations thereof provided the binder remains solvent soluble and thermoplastic. The moieties may form part of the monomeric units which constitute the polymeric binder or may be grated onto a pre-prepared polymer or interpolymer. The binder of this type may be a homopolymer or it may be an interpolymer of two or more separate monomeric units wherein at least one of the monomeric units contains one of the moieties identified above.

Preferred binders for use in the Binder Oriented System include polystyrene, poly (styrene/acrylonitrile), poly(styrene/ methyl methacrylate), and polyvinyl benzal as well as admixtures thereof.

The same photoinitiator system activatable by actinic radiation may be used in either the Monomer Oriented System or the Binder Oriented System. Typically the photoinitiator system will contain a photoinitiator and may contain a sensitizer which extends the spectral response into the near U.V. region and the visible spectral regions.

Preferred photoinitiators include CDM-HABI, i.e., 2-(o-chlorophenyl)-4,5-bis(m-methoxyphenyl)-imidazole dimer; o-CI-HABI, i.e., 1,1'-biimidazole, 2,2'-bis-(o-chlorophenyl)-4,4', 5,5'-tetraphenyl-; and TCTM-HABI, i.e., 1H-Imidazole, 2,5-bis(o-chlorophenyl)-4-3,4-dimethoxyphenyl-, dimer each of which is typically used with a hydrogen donor, e.g., 2-mercaptobenzoxazole.

Preferred sensitizers include the following:

DBC, i.e., Cyclopentanone, 2,5-bis-(diethylamino)-2-methylphenyl)methylene);

DEAW, i.e., Cyclopentanone, 2,5-bis-((4-diethylamino)-phenyl)methylene); and

Dimethoxy-JDI, i.e., 1H-Inden-1-one, 2,3-dihydro-5,6-dimethoxy-2-((2,3,6,7-tetrahydro-1H,5H-benzo[i,j]quinolizine-9-yl)-methylene)-.

The solid photopolymerizable compositions of this invention may contain a plasticizer. Plasticizers of this invention may be used in amounts varying from about 2% to about 20% by weight of the compositions preferably 5 to 15 wt. %.

Preferred plasticizers for use in simple cellulose acetate butyrate systems are triethyleneglycol dicaprylate, tetraethyleneglycol diheptanoate, diethyl adipate, Brij 30 and tris-(2-ethylhexyl)phosphate. Similarly, triethyleneglyco dicaprylate, diethyl adipate, Brij 30, and tris(2-ethylhexyl)-phosphate are preferred in "Monomer Oriented Systems" where cellulose acetate butyrate is the binder.

Other components in addition to those described above can be present in the photopolymerizable compositions in varying amounts. Such components include: ultraviolet radiation absorbing material, thermal stabilizers, hydrogen donors, oxygen scavengers and release agents.

Amounts of ingredients in the photopolymerizable compositions will generally be within the following percentage ranges based on total weight of the photopolymerizable layer: monomer, 5-50%, preferably 15-35%; initiator 0.1-10%, preferably 1-5%; binder, 25-75%, preferably 45-65%; plasticizer, 0-25%, preferably 5-15%; other ingredients 0-5%, preferably 1-4%.

The supports can be any substance transparent to actinic radiation that provides sufficient support to handle the combined base and layer. Preferably the support is transparent to light in the spectral region of 0.6 through 1.6 micrometers wavelengths. The term "support" is meant to include natural or synthetic supports, preferably one which is capable of existing in a flexible or rigid film or sheet form. For example, the support or substrate could be a sheet or film of synthetic organic resin, or a composite of two or more materials. Specific substrates include polyethylene terephthalate film, e.g., resin-subbed polyethylene terephthalate film, flame or electrostatic discharge treated polyethylene terephthalate film, glass, cellulose acetate film, and the like. The thickness of the supports has no particular importance so long as it adequately supports the film or layer removably adhered to it. A support thickness of about twenty-five (25) to fifty (50) micrometers using polyethylene terephthalate provides sufficient rigidity.

TABLE A

| BASE OR WAVEGUIDE LAYER | |
|---|---|
| INGREDIENT | WEIGHT % |
| Cellulose acetate butyrate[1] | 56.54 |
| Phenoxyethyl acrylate | 35.00 |
| Triethyleneglycol dicaprylate | 5.00 |
| o-Cl HABI[2] | 1.00 |
| 2-Mercaptobenzoxazole | 1.89 |
| Sensitizing dye (DEAW)[3] | 0.56 |
| 2,6-Di-t-butyl-4-methylphenol | |

[1]Eastman type CAB 531-1
[2]1,1'-bis-biimidazole, 2,2'-bis-o-chlorophenyl-4,4',5,5'-tetraphenyl; CAS 1707-68-2
[3]2,5-bis([4-diethylamino)-phenyl]methylene)cyclopentanone

TABLE B

| BUFFER LAYER | |
|---|---|
| INGREDIENT | WEIGHT % |
| Poly(vinylacetate), MW 500,000, | 66.04 |

TABLE B-continued

| BUFFER LAYER | |
|---|---|
| INGREDIENT | WEIGHT % |
| CAS 9003-20-7 Phenol ethoxylate monoacrylate, CAS 56641-05-5 | 17.02 |
| Ethoxylated bisphenol A diacrylate, CAS 24447-78-7 | 3.00 |
| N-Vinyl carbazole | 7.94 |
| o-Cl-HABI[1] | 3.69 |
| 4-Methyl-rH-1,2,4-triazole-3-thiol, CAS 24854-43-1 | 2.09 |
| FC-430[2] | 0.19 |
| Sensitizing dye (DEAW)[3] | — |

[1]1,1'-bis-biimidazole, 2,2'-bis-o-chlorophenyl-4,4',5,5'-tetraphenyl; CAS 1707-68-2
[2]fluoroaliphatic polymeric esters, 3M Company, St. Paul, MN
[3]2,5-bis([4-(diethylamino)-phenyl]methylene)cyclopentanone

TABLE C

| BUFFER LAYER | |
|---|---|
| INGREDIENT | WEIGHT % |
| Cellulose acetate butyrate[1] | 57.11 |
| Phenoxyethyl acrylate | 38.00 |
| o-Cl HABI[2] | 3.00 |
| 2-Mercaptobenzoxazole | 1.89 |

[1]Eastman type CAB 531-1
[2]1,1'-bis-biimidazole, 2,2'-bis-o-chlorophenyl-4,4',5,5'-tetraphenyl: CAS 1707-68-2

In order to improve the performance of optical waveguide devices, such as the ones described above, a layer of doped glass is applied to their outer surfaces, which serve as a substrate. This layer can be applied directly to the substrate, or it can be applied indirectly, i.e., atop one or more intermediate layers which are themselves located on the substrate. One such intermediate layer, for example, can be silicon oxide, which is described in more detail below. The doped glass coating should be thick enough to adequately improve the barrier properties of the substrate, but not so thick as to seriously degrade transparency of the substrate or to result in loss of durability or flexibility of the glass, when the substrate is a film. Typically coatings of about 20 to about 500 nm are suitable, depending on the effectiveness of the particular glass composition. A thickness of about 50 to about 350 nm is preferred, although for some compositions a thickness of about 200 to 400 nm is desirable; for particularly effective compositions, a coating of 50 to 100 nm is quite adequate.

The doped glass coating is based on silicon dioxide and is generally applied to the substrate in a batch or continuous process by any of a variety of conventional vacuum methods. The portion of the substrate to be coated is positioned either by a continuous process or batch process in a chamber within which a vacuum is drawn. A source of silicon dioxide and dopant metal (in either different sources or comixed in a single source, either as a powder, a metal wire, or vitrified into a silica glass) is placed in the vacuum chamber and vaporized by heating with an electron beam or a resistance or induction heated furnace, or by sputtering or reactive sputtering by an ion beam or a magnetron source, or the like. The silicon dioxide, along with the dopant metal, condenses to form the desired coating. The thickness of the coating is determined by the residence time of the substrate in the chamber, the amount of oxide target present in the chamber relative to the area of the substrate, and/or the energy delivered to the source per unit area of the source.

The silicon dioxide coating of the present invention is doped with a high level of at least one of a select group of metals. The term "doping" is used herein to describe a deposition with silicon dioxide of a relatively high level of metal, typically 0.5 to about 25 weight percent, as measured in the source, or about 0.5 to about 30 weight percent as measured as metal in the glass coating itself. (It is understood that the term "doped" or "doping" previously has been used in the art to refer to lower levels of metal additive, typically well below 1%. This is not what is meant by "doped" in the context of the present invention.)

The oxidation state of the metal as it resides in the coating matrix of silicon dioxide is not necessarily clearly understood or well defined. Thus if an elemental metal is used as the source for the dopant, the deposited metal atoms or particles may interact with the oxygen atoms of the matrix to form a partially or completely oxidized material. Alternatively, if an oxide of the metal is used as the source, it is not necessarily known nor is it necessarily important whether the metal is deposited into the glassy matrix as the oxide or as the elemental metal. It appears that either the elemental metal or an oxide of the metal or certain other metal compounds, regardless of oxidation state can be suitably used as the source of the dopant metal for the present invention. Such possibilities and equivalents thereof are included within the scope of the present invention when terms such as "metal dopant" or the like are used. The selection of an appropriate source for metal dopant will be within the abilities of one skilled in the art and will be determined by such factors as relative cost and ease of handling. In many cases the metal oxide or especially the elemental metal will be preferred.

Suitable metal dopants for the present invention include antimony, aluminum, chromium, cobalt, copper, indium, iron, lead, manganese, tin, titanium, tungsten, zinc, and zirconium. Preferred metals include chromium, manganese, zinc, and most preferably copper and tin. When one or more of these metals are present, the barrier property of the glass coating and of the structure as a whole is greatly improved. Surprisingly it has been found that many other metals do not show this sort of improvement. Among the metals that are not particularly effective at comparable levels are calcium, vanadium, lithium, nickel, molybdenum, gold, germanium, and selenium. Sulfur is similarly not effective. It is surprising that these elements appear in the same regions of the periodic table with the metals that are effective. The chemical phenomenon that distinguishes between these groups of metals is not understood. It is noted that the metals which form a part of the present invention are located to the right of Column II of the Periodic Table, that is, to the right of the alkali metals and the alkaline earth metals.

When a metal dopant from the metals of the present invention is used in the layer of silicon dioxide, the improvement in barrier properties can be dramatic. One customary measurement of barrier properties of a film is its oxygen transmission rate ("OTR") expressed as mL oxygen passage/$m^2$-day-atmosphere. A film of ordinary untreated PET (polyethylene terephthalate), 23 micrometers thick, typically has an OTR of 75–90; that of a 12 micrometer film is typically 150–180. Addition of a 300 nm coating of $SiO_2$ reduces the OTR somewhat, to about 10–80. Addition of one or more of the metals of the present invention can routinely reduce the OTR to less than 5. In copper, the most preferred case, addition of even 1 percent to the $SiO_2$ (measured in the source)

can reduce the OTR to as low as 0.5, while use of 5-10 percent copper can result in values as low as 0.3. Use of tin, which is also preferred, provides values nearly as low.

The effectiveness of the barrier properties depends not only on the type of metal involved but also, of course, on the thickness of the glass layer. The effect of total glass thickness can be factored out by focusing on the oxygen permeation value ("OPV," mL-mm/m$^2$-day-atm), which provides a measure of the inherent barrier properties of the glass. A coating of SiO$_2$ alone exhibits an OPV on the order of 0.1 or higher. The coatings of the present invention exhibit OPV of typically $3 \times 10^{-3}$ or lower, and in the best cases as low as $1 \times 10^{-4}$ or better.

The OTR or OPV of a particular film or composition is not a simple linear function of dopant concentration. For each metal dopant there appears to be a certain minimum concentration required to achieve a significant improvement, a concentration range, varying somewhat with the metal but generally within about 0.5 to about 30 weight percent (calculated as elemental metal in total glass layer), where the invention is effective, and a region of higher metal concentration within which the effectiveness diminishes or the optical transparency of the film is adversely affected.

It has further been found that in one embodiment of the present invention, the appearance and resistance of the coated structure to retort conditions is improved when a thin underlayer of SiO is applied to the substrate.

In addition to the above described layers, an additional protective layer can be added. Such a layer can be selected from any plastic resin that adheres to the SiO$_2$ layer or that adheres via an intervening adhesive layer. Examples of protective layers include a layer of polyester (adhered to the SiO$_2$ layer via an adhesive), polyamides, acrylonitrile copolymers, polyvinylidene chloride, polyethylene, polypropylene, ethylene vinyl acetate copolymer, ethylene/acrylic or methacrylic acid copolymer and ionomer. The protective layer can be applied to the SiO$_2$ layer by conventional processes such as adhesive or thermal laminating or extrusion coating simultaneous with extrusion of the intervening adhesive, if any. The protective layer can also be provided by solvent or dispersion coating onto the SiO$_2$ layer, using multiple coatings if thickness greater than achievable by single coating is desired. The thickness of the protective layer will generally be about 0.5 to 100 micrometers, preferably 10 to 25 micrometers (0.010 to 0.025 mm).

The barrier properties of a layer, such as the one utilized in this invention may be determined by applying the layer on a single film, so that the transmission rate may be defined more accurately and characterize the character of the layer. A PET film was selected to run this series of experiments.

EXAMPLES 1-136

Silicon dioxide was mixed with a dopant material and loaded into the hearth of an electron beam evaporator of the single crucible bent beam source type as sold by a variety of manufacturers including Denton Vacuum of Cherry Hill, N.J. A thin film was formed from this mixture onto the smoother surface of a 23 micrometer (92 gauge) PET film (Mylar ® type D) by electron beam evaporation from the mixture. The accelerator voltage was continuously adjusted to sweep the beam across the material in the source crucible to give uniform erosion of the crucible's contents. The filament current (and hence the beam current) was adjusted to provide a high deposition rate, resulting in a relatively high background pressure of about $1.3 \times 10^{-2}$ Pa (about $1 \times 10^{-4}$ torr). This pressure was not so high as to cause premature arc over of the electron beam gun. The thickness of the deposit was monitored by a calibrated oscillating quartz crystal monitor such as manufactured by Veeco Instruments Inc., Plainview, N.Y. The film (unless another grade is reported) had an average (RA) surface roughness of 2-7 nanometers. The coated film's oxygen transmission rate was measured using an "Ox-Tran 1000 ®" oxygen permeation device manufactured by Modern Control Inc. of Minneapolis, Minn. All data in Table I were obtained at 30° C. at 80% relative humidity, using 100% oxygen at 1 atmosphere pressure (about 101 kPa). The results are reported in the Tables as oxygen transmission rate (mL/m$^2$-day-atm). In addition the results are reported as oxygen permeation value (mL-mm/m$^2$-day-atm) by subtracting the (minimal) barrier properties of the uncoated film and dividing the result by the thickness of the glass coating.

The results for the first Examples, Table I, Examples 1-11, illustrate the poor barrier properties of PET film treated with a layer of undoped silicon dioxide.

TABLE I

| Ex.[a] | Dopant | Thickness nm | OTR | OPV × 10$^6$ |
|---|---|---|---|---|
| C1 | none | 325 | 23.6 | 12054 |
| C2 | " | 300 | 84.3 | >100000 |
| C3 | " | 301 | 76.4 | >100000 |
| C4 | " | 303 | 77.1 | >100000 |
| C5 | " | 314 | 7.1 | 2517 |
| C6 | " | 315 | 62.1 | >100000 |
| C7 | " | 323 | 51.6 | 83026 |
| C8 | " | 355 | 10.1 | 4238 |
| C9[b] | " | — | 161.5 | — |
| C10[b] | " | — | 72.4 | — |
| C11[b] | " | — | 28.1 | — |

[a]Examples designated "C" are included for comparative purposes
[b]PET film having a surface roughness of 26-33 nm and a thickness of 12 micrometers
— indicates value not measured The results in the next series of Examples, Table II, Examples 12-57, illustrate many of the metal dopants which are not a part of the present invention. Most of these dopants do not provide significant improvements in barrier properties in the concentration ranges examined, although a few do show improvement (e.g., MgF$_2$, MgO, BaO, disclosed in U.S. Pat. No. 4,702,963 along with CaO which does not show adequate activity). For reasons which are not fully understood, low levels of lithium borate, Li$_2$B$_4$O$_7$, seem to be effective and are thus considered to be included within the scope of the present invention.

TABLE II

| Ex.[a] | Dopant | % | Thickness nm | OTR | OPV × 10$^6$ |
|---|---|---|---|---|---|
| C12 | Ag | 10 | 301 | 8.5 | 2944 |
| C13 | AgO | 10 | 300 | 5.9 | 1944 |
| C14 | BaO | 10 | 307 | 2.6 | 828 |
| C15 | " | 30 | 315 | 7.7 | 2743 |
| C16 | B$_2$O$_3$ | 3 | 326 | 80.3 | >100000 |
| C17 | " | 10 | 213 | 77.2 | >100000 |
| C18 | " | 10 | 327 | 83.4 | >100000 |
| C19 | Ca(BO$_2$)$_2$ | 10 | 290 | 74.7 | >100000 |
| C20 | " | 10 | 303 | 35.5 | 23832 |
| C21 | " | 25 | 239 | 82.5 | >100000 |
| C22 | " | 50 | 230 | 73.2 | >100000 |
| C23 | CaO | 10 | 301 | 6.0 | 1985 |
| C24 | " | 30 | 265 | 12.3 | 4042 |

TABLE II-continued

| Ex.[a] | Dopant | % | Thickness nm | OTR | OPV × 10⁶ |
|---|---|---|---|---|---|
| C25 | K₂O | 10 | 308 | 27.0 | 14319 |
| C26 | Li | 3 | — | 80.6 | — |
| 27 | Li₂B₄O₇ | 1 | 307 | 2.5 | 797 |
| 28 | " | 2 | 301 | 2.4 | 756 |
| C29 | " | 7 | 301 | 41.5 | 34897 |
| C30 | LiF | 1 | 301 | 30.1 | 17002 |
| C31 | " | 4 | 300 | 50.4 | 68597 |
| C32 | MgCl₂ | 2 | 301 | 51.7 | 78306 |
| C33 | " | 10 | 246 | 19.0 | 6639 |
| C34 | " | 10 | 246 | 23.3 | 8955 |
| C35 | MgF₂ | 1 | 303 | 20.6 | 9185 |
| C36 | " | 2 | 299 | 1.1 | 320 |
| C37 | " | 5 | 105 | 4.0 | 449 |
| C38 | " | 5 | 201 | 2.2 | 455 |
| C39 | " | 5 | 303 | 1.1 | 334 |
| C40 | " | 10 | 297 | 1.1 | 328 |
| C41 | " | 10 | 308 | 1.1 | 340 |
| C42 | " | 15 | 306 | 2.2 | 713 |
| C43 | " | 30 | — | 10.2 | — |
| C44 | MgO | 5 | 304 | 1.9 | 602 |
| C45 | " | 10 | 302 | 5.4 | 1766 |
| C46 | " | 35 | 215 | 1.6 | 341 |
| C47 | " | 35 | 306 | 1.6 | 486 |
| C48 | Na₂B₄O₇ | 4 | 321 | 29.9 | 17889 |
| C49 | " | 10 | — | 57.2 | — |
| C50 | " | 10 | 265 | 66.0 | >100000 |
| C51 | Na₂SO₄ | 5 | 302 | 60.2 | >100000 |
| C52 | " | 20 | 304 | 70.3 | >100000 |
| C53 | Na + Al[a] | | 301 | 73.1 | >100000 |
| C54 | Mo | 10 | 302 | 72.7 | >100000 |
| C55 | Ni | 10 | 299 | 55.8 | >100000 |
| C56 | Si | 10 | 304 | 3.3 | 1073 |
| C57 | " | 20 | 307 | 1.5 | 463 |

[a] A fused glass; exact composition unknown.

The next series of Examples, Table III, Examples 58–67, show certain metal compound dopants (AlF₃, CuCO₃, CuF₂, Cu₅Si, and WO₂) which are effective only at comparatively higher concentrations in the source, e.g., about 20%. It is believed that these materials evaporate at a slower rate than does SiO₂, resulting in lower actual concentrations in the films. Yet it is believed that when a sufficient amount of metal is deposited in the glass coating, the results nevertheless show significant improvement in barrier properties.

TABLE III

| Ex.[a] | Dopant | % | Thickness nm | OTR | OPV × 10⁶ |
|---|---|---|---|---|---|
| C58 | AlF₃ | 2 | 302 | 19.5 | 8445 |
| 59 | " | 10 | 313 | 2.9 | 961 |
| C60 | CuCO₃—Cu(OH)₂ | 5 | 302 | 15.3 | 6038 |
| 61 | CuCO₃ | 20 | 300 | 1.6 | 491 |
| C62 | CuF₂ | 5 | 273 | 9.8 | 3152 |
| C63 | Cu₅Si | 5 | 308 | 78.9 | >100000 |
| 64 | " | 20 | 302 | 1.9 | 588 |
| 65 | " | 20 | 302 | 0.9 | 275 |
| C66 | WO₂ | 5 | 286 | 79.9 | >100000 |
| 67 | WO₃ | 20 | 123 | 4.1 | 537 |

The last series of Examples, in Table IV, Examples 68–136, illustrate the results using metal dopants of the present invention. Concentrations of metal within the effective concentration ranges provide marked improvements in barrier properties. (In some of the examples using copper, the metal was added to the source material in the form of a wire; in other examples, as a powder. No consistent differences in the results were observed.)

TABLE IV

| Ex.[a] | Dopant | % | Thickness nm | OTR | OPV × 10⁶ |
|---|---|---|---|---|---|
| 68 | Al | 2 | 303 | 1.9 | 595 |
| 69 | " | 10 | 303 | 1.3 | 403 |
| 70 | " | 10 | 311 | 1.6 | 494 |
| 71 | " | 15 | 312 | 4.5 | 1496 |
| C72[a] | " | 30 | 321 | 14.3 | 5875 |
| 73 | Co | 10 | 214 | 0.9 | 196 |
| 74 | Cr | 10 | 303 | 1.3 | 408 |
| 75 | " | 20 | 302 | 1.9 | 603 |
| 76 | " | 30 | 300 | 0.7 | 207 |
| 77 | " | 30 | 302 | 1.3 | 387 |
| C78 | Cu | 1 | 300 | 8.1 | 2793 |
| C79[a] | " | 1 | 300 | 124.0 | >100000 |
| 80 | " | 1 | 301 | 0.5 | 160 |
| 81 | " | 2 | 26 | 3.7 | 102 |
| 82 | " | 2 | 52 | 4.9 | 276 |
| 83 | " | 2 | 301 | 0.7 | 198 |
| 84 | " | 3 | 303 | 4.1 | 1334 |
| 85[b] | " | 5 | — | 0.7 | — |
| C86 | " | 5 | 28 | 11.4 | 388 |
| 87 | " | 5 | 51 | 2.1 | 109 |
| 88 | " | 5 | 100 | 0.9 | 90 |
| 89 | " | 5 | 301 | 0.5 | 160 |
| 90 | " | 5 | 301 | 1.0 | 308 |
| 91 | " | 5 | 303 | 0.3 | 80 |
| 92[c] | " | 5 | 305 | 2.6 | 829 |
| 93[d] | " | 5 | 300 | 2.5 | 770 |
| 94[e] | " | 5 | 295 | 2.2 | 658 |
| C95[f] | " | 5 | 300 | 7.6 | 2428 |
| 96[g] | " | 5 | 298 | 5.1 | 1712 |
| 97[h] | " | 5 | 300 | 0.9 | 271 |
| 98[h] | " | 5 | 302 | 1.8 | 567 |
| 99[i] | " | 5 | 301 | 1.5 | 527 |
| 100 | " | 5 | 301 | 0.9 | 289 |
| C101 | " | 5 | 303 | 60.3 | >100000 |
| C102 | " | 10 | 26 | 7.6 | 225 |
| 103 | " | 10 | 28 | 2.9 | 84 |
| 104 | " | 10 | 51 | 2.9 | 155 |
| 105 | " | 10 | 102 | 3.3 | 360 |
| 106 | " | 10 | 117 | 2.1 | 257 |
| 107 | " | 10 | 301 | 0.3 | 94 |
| 108 | " | 10 | 301 | 0.5 | 155 |
| 109 | " | 15 | 100 | 1.3 | 136 |
| 110 | " | 20 | 301 | 2.3 | 726 |
| 111 | " | 30 | 300 | 0.6 | 188 |
| C112 | Cu,B[k] | 5 | 302 | 74.1 | >100000 |
| 113 | Cu(NO₃)₂ | 5 | 253 | 3.5 | 933 |
| 114 | Fe | 5 | 302 | 1.4 | 421 |
| 115 | " | 10 | 304 | 3.6 | 1174 |
| 116 | In | 5 | 302 | 1.6 | 509 |
| 117 | " | 20 | 309 | 1.5 | 476 |
| 118 | Mn | 10 | 302 | 0.6 | 189 |
| 119 | Pb | 10 | 330 | 1.5 | 497 |
| 120 | " | 20 | 309 | 1.7 | 526 |
| 121 | Sb | 5 | 190 | 5.8 | 1093 |
| 122 | Sn | 5 | 302 | 1.2 | 358 |
| 123 | " | 5 | 304 | 1.1 | 335 |
| 124[j] | " | 5 | 130 | 1.6 | 256(est.) |
| 125 | " | 10 | 150 | 3.3 | 524 |
| 126 | " | 20 | 303 | 1.0 | 296 |
| 127 | " | 30 | 54 | 6.2 | 373 |
| C128[a] | " | 30 | 54 | 146.8 | >100000 |
| C129 | 316 stainless steel | 10 | 305 | 5.3 | 1767 |
| 130 | TiO₂ | 10 | 300 | 3.8 | 1200 |
| 131 | Zn | 10 | 65 | 6.2 | 448 |
| 132 | " | 10 | 257 | 1.4 | 375 |
| 133 | " | 10 | 296 | 5.9 | 1913 |
| 134 | " | 20 | 304 | 2.2 | 688 |
| 135 | ZnO | 10 | 308 | 1.8 | 555 |
| 136 | Zn | 5 | 301 | 3.9 | 1262 |

TABLE IV-continued

| Ex.[a] | Dopant | % | Thickness nm | OTR | OPV × 10[6] |
|---|---|---|---|---|---|
| | Cu | 2 | | | |

[a]Borderline example; results subject to scatter
[b]PET film "Melinex Type 442," surface roughness 10-18 nm. Coating thickness not measured
[c]PET film having a surface roughness of 10-18 nm and a thickness of 14 micrometers
[d]PET film having a surface roughness of 26-33 nm and a thickness of 12 micrometers
[e]PET film having a surface roughness of greater than 26 nm and a thickness of 23 micrometers.
[f]Polyester film having a surface roughness of 41-49 nm and a thickness of 12 micrometers.
[g]Laminate of the coated film to a layer of uncoated 12 micrometer PET, using copolyester adhesive sheet
[h]Laminate of the coated film to a layer of PET having a coating of heat sealable polyester copolymer, using copolyester adhesive sheet
[i]Laminate of the coated film to a layer of PET coated with PVDC, using copolyester adhesive sheet
[j]Substrate film poly(ethylene-2,6-naphthalene dicarboxylate with 30 nm undercoating of SiO
[k]Fused silica glass containing Cu and B
[l]18% Cr, 11% Ni, 2.5% Mo, <0.1% C, remainder Fe.

EXAMPLES 137-175

In the previous Tables the amount of dopant is listed as the amount present in the source in the hearth the evaporator. The actual amount present in the glass coating was independently measured for some samples by atomic absorption. About 2-2.5 g of the sample is weighed accurately and charred with concentrated sulfuric acid, then dissolved by addition of concentrated nitric acid (aqua regia) and concentrated hydrofluoric acid and heating. The solution is diluted to 100 mL and analyzed by an Applied Research Laboratories 34000 simultaneous inductively coupled plasma analyzer or a Perkin Elmer 6500 (sequential) inductively coupled plasma analyzer. The amounts of the reported elements are calculated assuming that the dopant is the elemental metal and the matrix is $SiO_2$ (m.w. 60). The results are shown in Table V.

TABLE V

| Ex. | Dopant | Thickness (nm) | Source % | Coating % |
|---|---|---|---|---|
| C137 | Ag | 303 | 10.0 | 0.1 |
| C138 | $B_2O_3$ | 300 | 10.0 | 0.7 |
| C139 | $MgF_2$ | 302 | 5.0 | 0.6 |
| C140 | " | 301 | 10.0 | 1.0 |
| C141 | Mo | 301 | 10.0 | 13.4 |
| C142 | $Na_2B_7O_4$ | 302 | 10.0 | { 2.1 Na / 1.3 B } |
| C143 | Ni | 300 | 10.0 | 16.3 |
| 144 | Al | 302 | 5.0 | 3.8 |
| 145 | " | 312 | 10.0 | 4.0 |
| 146 | " | 303 | 10.0 | <1.8 |
| 147 | Fe | 298 | 5.0 | 7.4 |
| 148 | " | 304 | 10.0 | 13.5 |
| 149 | Cr | 301 | 2.0 | 3.2 |
| 150 | " | 301 | 5.0 | 8.8 |
| 151 | " | 298 | 5.0 | 7.7 |
| 152 | " | 304 | 10.0 | 14.6 |
| 153 | " | 301 | 10.0 | 14.1 |
| 154 | Cu | 147 | 5.0 | 10.5 |
| 155 | " | 299 | 5.0 | 0.0 |
| 156 | " | 300 | 5.0 | 1.5 |
| 157 | " | 307 | 5.0 | 8.7 |
| 158 | " | 310 | 5.0 | 7.4 |
| 159 | " | 152 | 10.0 | 15.8 |
| 160 | " | 299 | 10.0 | 8.7 |
| 161 | " | 303 | 10.0 | 6.2 |
| 162 | " | 305 | 10.0 | 21.2 |
| 163 | " | 276 | 10.0 | 17.1 |
| 164 | " | 301 | 20.0 | 30.2 |
| 165 | " | 153 | 20.0 | 29.8 |
| 166 | Mn | 302 | 10.0 | 12.9 |

TABLE V-continued

| Ex. | Dopant | Thickness (nm) | Source % | Coating % |
|---|---|---|---|---|
| 167 | Sn | 301 | 2.0 | 8.8 |
| 168 | " | 152 | 5.0 | 12.2 |
| 169 | " | 304 | 5.0 | 24.3 |
| 170 | " | 302 | 5.0 | 17.5 |
| 171 | " | 301 | 5.0 | 12.0 |
| 172 | " | 271 | 5.0 | 8.8 |
| 173 | " | 153 | 10.0 | 14.6 |
| 174 | " | 306 | 10.0 | 24.7 |
| 175 | " | 285 | 10.0 | 26.4 |

The considerable scatter in the analysis of the coating composition is believed to arise from several sources including inaccuracies in the atomic absorption technique and the use of a laboratory evaporation method which uses a powder mixture of the components which may be less reproducible than desired. However correlations can be obtained which indicate actual coating compositions with a calculable uncertainty. The results relating to the metals included in the present invention all indicate a higher concentration of the dopant metal in the coatings than in the source, with the possible exception of aluminum and silver. These trends are believed to be related to the relative vapor pressures of the metals compared with silicon dioxide. In particular the amount of copper or chromium in the glassy coating is about 1.4-1.5 times the amount in the source; the amount of tin in the coating is about 2.4-2.5 times the amount in the source. Metal compound dopants, for example some metal oxides, which may have lower vapor pressures than the elemental metals, may exhibit different correlations from those seen for the elemental metals. This phenomenon would explain the behavior of the examples in Table III, which require higher concentrations in the source to be effective. However, differences in vapor pressure cannot explain the ineffectiveness of such metals as nickel or molybdenum, which do appear in the coatings in amounts comparable to those for, e.g., copper.

EXAMPLES 176-209

The Examples in Table VI show the effect of increasing dopant levels on visible light transmission of films prepared according to the procedure of Examples 1-136 using a batch "bell-jar" process. The visible light absorbance (from which transmission is calculated) was measured using a Hewlett-Packard 8452A diode-array UV-vis spectrophotometer, having a bandwidth of 2 nm, wavelength reproducibility of ~0.05 nm, and stability of <0.002 absorbance units. The device measures the entire UV and visible absorbance spectrum simultaneously without scanning. The zero absorbance level was defined using air as the blank. For each film the absorbance spectrum from 360 to 740 nm was measured and stored on disk. The absorbencies at 400 and 550 nm are reported. It is observed that percent transmission decreases with increasing dopant level; preferred films are those which retain at least about 70 percent transmission at 550 nm. Iron, chromium, and tin appear to be preferred in minimizing loss of optical transmission. Iron appears particularly suitable in this regard and actually appears to enhance the optical transmission.

TABLE VI

| Ex. | Dopant | % | Thickness (nm) | % Transmission 400 nm | % Transmission 550 nm |
|---|---|---|---|---|---|
| C176 | (no coating) | | | 85.01 | 88.71 |
| C177[a] | (no coating) | | | 69.25 | 77.34 |
| C178 | none | — | 323 | 81.85 | 83.18 |
| C179 | " | | 303 | 75.68 | 83.56 |
| C180 | MgF$_2$ | 5 | 201 | 88.10 | 88.10 |
| 181 | " | 5 | 306 | 88.98 | 90.19 |
| 182 | " | 10 | 301 | 86.90 | 92.17 |
| C183[b] | SF$_6$ | 5 | 306 | 86.60 | 87.70 |
| 184 | Al | 5 | 304 | 76.21 | 80.91 |
| 185 | " | 15 | 312 | 38.90 | 75.86 |
| 186 | " | 30 | 321 | 1.45 | 28.18 |
| 187 | Cr | 5 | 304 | 84.96 | 88.73 |
| 188 | " | 10 | 152 | 82.45 | 82.42 |
| 189 | " | 10 | 303 | 85.62 | 90.07 |
| 190 | " | 20 | 76 | 81.16 | 83.67 |
| 191 | " | 20 | 153 | 70.89 | 78.76 |
| 192 | " | 20 | 302 | 12.30 | 31.62 |
| 193 | Cu | 5 | 300 | 59.57 | 71.94 |
| 194 | " | 5 | 301 | 73.79 | 81.66 |
| 195 | " | 10 | 117 | 64.12 | 72.44 |
| 196 | " | 10 | 311 | 51.71 | 71.94 |
| 197 | " | 20 | 78 | 84.96 | 88.73 |
| 198 | " | 20 | 155 | 50.05 | 61.44 |
| 199 | " | 20 | 301 | 25.59 | 39.81 |
| 200 | " | 20 | 302 | 53.48 | 65.80 |
| 201 | Fe | 5 | 302 | 87.90 | 89.41 |
| 202 | " | 10 | 304 | 82.99 | 89.54 |
| 203 | Mn | 10 | 302 | 78.16 | 83.95 |
| 204 | Pb | 10 | 330 | 26.61 | 41.88 |
| 205 | Sn | 5 | 302 | 85.11 | 88.72 |
| 206 | " | 10 | 150 | 82.70 | 85.51 |
| 207 | " | 10 | 311 | 84.45 | 85.29 |
| 208 | " | 20 | 76 | 86.50 | 90.16 |
| 209 | " | 20 | 303 | 25.94 | 36.31 |

[a] Commodity PET film with internal slip additive, 24 micrometers thick.
[b] Coating prepared from lead glass - about 70% Pb

EXAMPLE 210

An optical device as the ones described earlier is constructed in a pattern similar to the one shown in FIG. 12, which includes two single waveguides and one 1×4 splitter. The optical waveguide device contains one base or waveguide layer having a nominal thickness of 7.5 micrometers, on which the waveguide pattern is formed as already explained. The nominal width of the wave guide is 7.5 micrometers at the input, and 6 micrometers internal to the Y splitters, as shown in FIG. 12. A nominal forming exposure of 20 millijoules/sq.cm. is used. The waveguide layer has the composition shown on Table VII. The device has also two inner buffer layers, one on each side of the waveguide layer, having a nominal thickness of 26 micrometers each. The composition of the inner buffer layers is shown in Table VIII. In the outside of the inner buffer layers, two outer buffer layers are also formed having a nominal thickness of 28 micrometers each. Their composition is shown in Table IX.

Both straight waveguides and the 1×4 splitter patterns are tested by taking power measurements with UDT Ge detector (United Detector Technology, Boston, Mass.) and model S380 power meter. The waveguide output is imaged on the detector with a Nikon Flour 100 mag oil lens with 1.3 NA (Model Ph4DL). Measurements regarding power loss are taken at 1300 nm and 1550 nm wavelengths using light sources from Lasertron QLM 1300SM501 and QLM 1550SM501 launched from an AT&T single-mode fiber.

After completion of the initial optical performance measurements, the sample is coated on one side with SiO$_2$ containing 5% Cu, and on the other side with SiO$_2$ containing 5% Sn, in both cases to a nominal thickness of 300 nanometers. The aforedescribed electron beam vacuum apparatus is used, wherein the samples are taped near the edges on a glass slide, and the glass slide is taped on a rotating drum having a nominal diameter of 13 cm.

The sample is then retested, using the same conditions and apparatus for optical characterization noted above. No measurable degradation in the process of applying the evaporated glass coating is detected.

A drop of water is then placed on one of the surfaces of the sample for 16 hours. The sample is again retested, using the same conditions and apparatus for optical characterization noted above. No measurable degradation is detected.

A drop of water is then placed on the other surface of the sample for 16 hours. The sample is once again retested, using the same conditions and apparatus for optical characterization noted above. No measurable degradation is detected.

A nominal loss of power due to the different types of losses before and after the conditions described above is of the order of 0.5 db per centimeter. If a drop of water is placed however without the device having previously been coated with the doped silicon dioxide with the appropriate dopants, the power loss increases considerably, and a nominal loss value of 0.8 db is received. In addition, observation of the near-field mode structure obtained by imaging the output of the waveguide on an infrared camera and displaying it on a video screen demonstrates no signs of background noise or changes from the previous measurements when the water drop test is used, if the coatings of this invention are present. The impact of water placed on similar, but uncoated samples is that the near-field image is progressively surrounded by increasing levels of scattered light as a result of water being diffused into the sample.

Finally, the results received regarding water permeation through the coatings on polyethylene terephthalate using the different embodiments of this invention, reflect the quality of barrier on an optical waveguide device also. The lower the permeation rate of the coating on the polyethylene terephthalate film, the better the barrier properties of the coating on the optical waveguide device.

TABLE VII

| Waveguide Layer | |
|---|---|
| | % by wt. |
| Polyox WSRN-3000 | 1.00 |
| CAB 531-1 | 55.41 |
| Photomer 4039 | 34.94 |
| Sartomer 349 | 4.99 |
| MMT | 1.90 |
| o-Cl HABI | 1.00 |
| DEAW | 0.55 |
| BHT | 0.01 |
| 3M FC-430 | 0.20 |

TABLE VIII

| Inner Buffer Layer | |
|---|---|
| | % by wt. |
| Polyox WSRN-3000 | 45.00 |
| CAB 531-1 | 55.92 |
| Photomer 4039 | 23.45 |
| Sartomer 349 | 10.20 |
| o-Cl HABI | 0.97 |
| Ethyl Michler's Ketone | 0.49 |
| Benzophenone | 2.91 |

TABLE VIII-continued

| Inner Buffer Layer | |
|---|---|
| | % by wt. |
| TDMA | 5.10 |

TABLE IX

| Outer Buffer Layer | |
|---|---|
| | % by wt. |
| CAB 381-20 | 45.50 |
| Photomer 4039 | 20.00 |
| Sartomer 349 | 8.50 |
| TDMA | 20.00 |
| MMT | 1.50 |
| o-Cl HABI | 1.00 |
| Ethyl Michler's ketone | 0.48 |
| Benzophenone | 3.02 |

Examples demonstrating the operation of the instant invention have been given for illustration purposes only, and should not be construed as restricting the scope or limits of this invention in any way.

What is claimed is:

1. An optical polymer waveguide device having superior barrier properties, comprising:
   (a) an optical waveguide device substrate, and
   (b) a glassy coating of silicon dioxide doped with at least one metal selected from the group consisting of antimony, aluminum, chromium, cobalt, copper, indium, iron, lead, manganese, tin, titanium, tungsten, zinc, and zirconium, said coating and metal dopant contained therein being present in an amount suitable to provide an oxygen transmission value through the coated structure of at most about 5 mL/day-m$^2$-atm.

2. The structure of claim 1 wherein the amount of glassy coating and the amount of metal dopant contained therein are suitable to provide an oxygen transmission value through the coated structure of at most about 1.5 mL/day-m$^2$-atm.

3. The structure of claim 1 wherein the amount of metal dopant is suitable to provide an oxygen permeation value for said glassy coating of at most about $3000 \times 10^{-6}$ mL-mm/day-m$^2$-atm.

4. The structure of claim 1 wherein the amount of metal dopant is suitable to provide an oxygen permeation value for said glassy coating of at most about $600 \times 10^{-6}$ mL-mm/day-m$^2$-atm.

5. The structure of claim 1 wherein the amount of metal dopant is suitable to provide an oxygen permeation value for said glassy coating of at most about $400 \times 10^{-6}$ mL-mm/day-m$^2$-atm.

6. The structure of claim 1 wherein the thickness of the glassy coating is about 20 to about 500 nm.

7. The structure of claim 6 wherein the thickness of the glassy coating is about 50 to about 350 nm.

8. The structure of claim 1 wherein the glassy coating of silicon dioxide is doped with a metal selected from the group consisting of copper, chromium, manganese, tin, and zinc.

9. The structure of claim 8 wherein the metal is copper.

10. The structure of claim 8 wherein the metal is tin.

11. The structure of claim 1 wherein the amount of dopant metal is sufficiently low that the optical density of said glassy coating retains at least about 70% optical transmission at 550 nm.

12. The structure of claim 1 wherein the amount of dopant metal calculated as elemental metal is about 0.5 to about 30 weight percent of the glassy coating.

13. The structure of claim 9 wherein the amount of copper in the glassy coating is about 1 to about 15 weight percent.

14. The structure of claim 10 wherein the amount of tin in the glassy coating is about 3 to about 30 weight percent.

15. The structure of claim 1 wherein the polymeric substrate is a film.

16. A multiple layer structure comprising the structure of claim 15 as at least one layer.

17. The structure of claim 1 further comprising a plastic resin protective layer.

18. A process for imparting barrier properties to an optical waveguide device substrate, comprising the steps of:
   (a) selecting an optical waveguide device substrate; and
   (b) vacuum depositing directly or indirectly onto said optical waveguide device substrate a glassy coating derived from silicon dioxide and at least one metal selected from the group consisting of antimony, aluminum, chromium, cobalt, copper, indium, iron, lead, manganese, tin, titanium, tungsten, zinc, and zirconium; wherein the amount of said glassy coating and the amount of metal contained therein is suitable to provide an oxygen transmission value of at most about 5 mL/day-m$^2$-atm.

19. The process of claim 18 wherein the source of the metal is elemental metal or metal oxide.

20. The process of claim 18 wherein the vacuum deposition process is sputtering or reactive sputtering.

21. The process of claim 18 wherein the vacuum deposition process is simultaneous evaporation from a silicon dioxide source and at least one metal producing source.

22. The process of claim 21 wherein the silicon dioxide and at least one metal producing source are physically comixed.

23. The process of claim 22 wherein the vacuum deposition process is electron beam evaporation.

24. The process of claim 23 wherein the amount of metal contained within the mixture exposed to the electron beam is about 0.5 to about 25%.

25. The process of claim 18 wherein the thickness of the glassy coating is about 21 to about 500 nm.

26. The process of claim 18 wherein the metal is copper.

27. The process of claim 18 wherein the metal is tin.

28. A structure having superior barrier properties, comprising:
   (a) an optical waveguide device substrate, and
   (b) a glassy coating of silicon dioxide doped with lithium borate in an amount suitable to provide an oxygen transmission value through the coated structure of at most about 5 mL/day-m$^2$-atm.

* * * * *